Jan. 8, 1952    R. A. JAMIESON    2,581,486
HAY-SHOCKING APPARATUS
Filed Nov. 17, 1948    2 SHEETS—SHEET 1
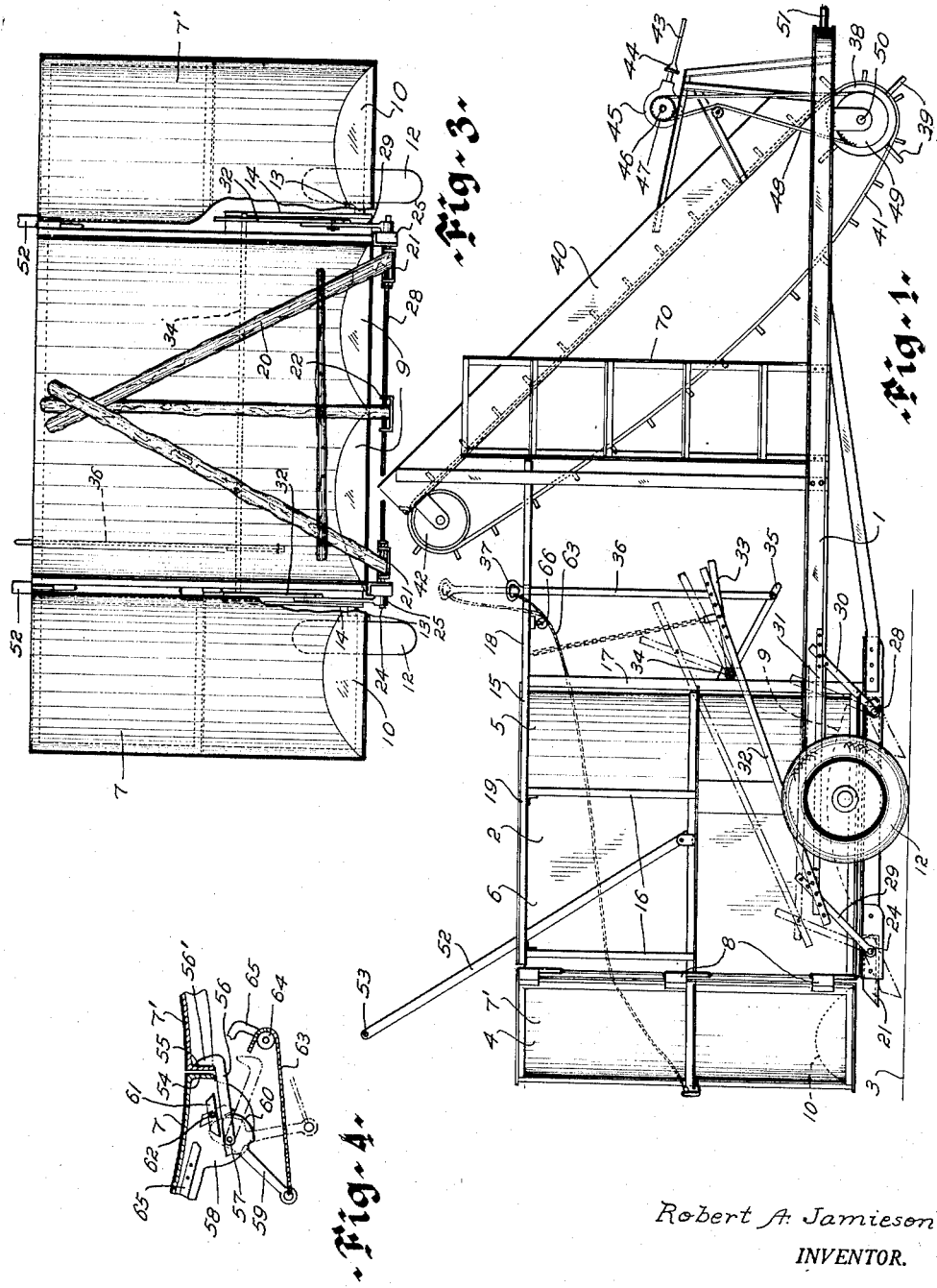
Robert A. Jamieson
INVENTOR.
BY *Alex. E. MacRae*
Attorney.

Jan. 8, 1952 R. A. JAMIESON 2,581,486
HAY-SHOCKING APPARATUS
Filed Nov. 17, 1948 2 SHEETS—SHEET 2
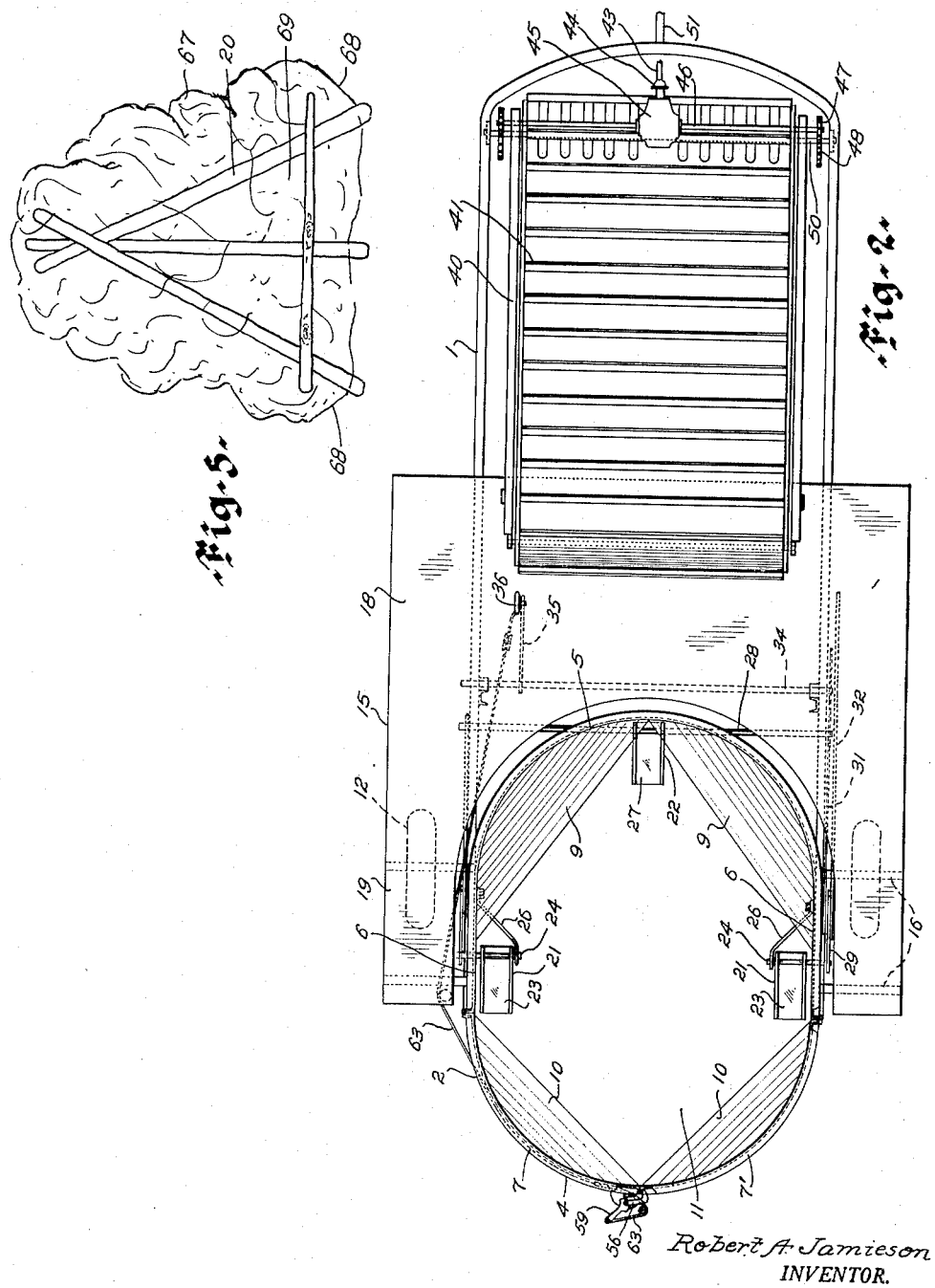
Robert A. Jamieson
INVENTOR.
BY Alex. E. MacRae
Attorney.

Patented Jan. 8, 1952

2,581,486

UNITED STATES PATENT OFFICE 2,581,486

HAY-SHOCKING APPARATUS

Robert A. Jamieson, Renfrew, Ontario, Canada

Application November 17, 1948, Serial No. 60,475

8 Claims. (Cl. 56—346)

This invention relates to a hay and the like shocking and curing apparatus.

Devices for shocking or cocking hay and the like have been heretofore proposed, such devices usually comprising a tank or bin to receive the hay, and an elevating means for conveying the hay to the bin. These machines are generally, however, subject to many disadvantages. Usually, they are of complicated structure and must include means for ejecting the formed hay shock. Moreover, the relatively large shock produced requires a prolonged period of time for curing purposes.

It is an object of this invention to provide a hay shocking apparatus which is relatively simple in structure and effective in use, and which includes associated means for ejecting and curing the formed hay shock.

The invention will be described with reference to the accompanying drawings, in which Figure 1 is a side elevation of the apparatus in accordance with the invention, Figure 2 is a plan view of the apparatus, Figure 3 is a rear elevation of the apparatus, Figure 4 is a detail plan view of a door locking means, and Figure 5 is an elevation of a hay shock produced by the apparatus.

Referring to the drawings, the apparatus includes a main frame member 1, which may comprise a U-shaped beam as shown. Mounted in fixed relation between the end portions of the arms of the member 1 is an upright hay-receiving tank or bin 2. The level of the bottom of the bin is somewhat below the level of the beam 1 and closely adjacent the ground level 3. The bin is oval-shaped in plan and has a curved rearward portion 4, a curved forward portion 5, and substantially flat intermediate portions 6. Thus, the bin is greater in length than width. Preferably the width is from two-thirds to three-quarters the length of the bin. Moreover, the height of the bin is preferably somewhat less than its width.

The rearward portion 4 consists of a pair of doors 7 and 7' hinged to the main bin body at 8 and extending from top to bottom of the bin.

The bin is open at the top and closed at the bottom by means of a pair of plates 9, extending from approximately the longitudinal axis of the bin at the forward end thereof to the intermediate portions 6 and joining opposed points on each half of the curved portions 5, and a pair of plates 10, one on each of the doors 7 and 7', also joining opposed points on each half of the curved portion 4. Thus, the major portion of the bottom is open, as indicated at 11. Each of plates 9 and 10 are downwardly inclined, thus imparting a partial conical configuration to the bottom of the bin.

The frame 1 with bin 2 are carried on a pair of road wheels 12, each of which is independently mounted on a stub axle 13, journalled in a frame member 14, fixed to the side of the bin.

A platform 15 is mounted on frame members 16 and 17 in substantially the same plane as the top of the bin, the platform having a portion 18 extending forwardly of the bin and extending rearwardly at 19 around each side of the bin.

A tripod frame 20 is adapted to be placed within the bin to support hay thereon and means for supporting the tripod in the tank comprises a pair of laterally opposed foot members 21 and an intermediate foot member 22.

Each foot 21 is mounted below the open section 11 of the bottom of the bin and closely adjacent the flat side portion 6 of the bin. Each foot 21 comprises a channel-shaped member having a rearward portion 23 adapted to receive one of the legs of tripod 20. Each foot 21 is fixed to a pin 24 journalled in auxiliary frame members 25 and 26 and extending through the forward portion of the foot.

The foot 22 is also mounted below the open section 11 of the bin and at the forward central portion of the bin. The foot 22 may also comprise a channel-shaped member having a rearward portion 27 adapted to receive the third leg of tripod 20. The foot 22 is fixed to a shaft 28 passing through the forward portion of the foot and journalled in the frame members 25.

The feet 21 and 22 are normally maintained in horizontally disposed or tripod-supporting position but means are provided for swinging the rearward portions of the feet downwardly by rotating the pins 24 and shaft 28 to allow the tripod to slide off the feet and engage the ground. Such means preferably comprises a lever 29 fixed to the outer end of each pin 24 and extending angularly therefrom in a forward and upward direction, and a lever 30 fixed to one of the outer ends of shaft 28 and extending in parallel relation to lever 29. A link 31 pivotally connects levers 29 and 30 for simultaneous parallel motion. A link 32 pivotally connects lever 29 with a forwardly extending arm 33 fixed to a shaft 34 journalled in the frame at the forward end of bin 2 and in upwardly spaced relation to link 31. A second arm 35 is fixed to shaft 34 and extends forwardly in angular relation to and below arm 33. A substantially vertically disposed lever 36 is slidably mounted in platform 15 and has its lower end pivotally connected to the free end of arm 35 and its upper end provided with a handle 37 for manual reciprocation thereof. It will be observed that upward movement of lever 36, as shown in dotted lines in Figure 1, will rotate shaft 34, swing arm 33 and link 32 upwardly to move levers 29 and 30 rearwardly, and thus rotate pins 24 and shaft 28 in a counterclockwise direction to tilt the feet 21 and 22 to the position shown in dotted lines.

Means for engaging the cut hay on the ground and for elevating it and depositing it upon platform 15 comprises a drum 38 revolvably mounted on the forward end of beam 1 and having hay-engaging teeth 39. An inclined elevator chute 40 extends from the forward end of beam 1 to a point above the forward portion 18 of the platform. An endless conveyor 41 is supported on drum 38 and a drum 42 revolvably supported on the upper end of the chute. Any suitable means for driving the conveyor may be provided. If a tractor is employed for propelling the device, a power take-off may be conveniently provided for driving the conveyor. As shown, this may comprise a driven shaft 43 connected through universal joint 44 and transmission 45 to driving shaft 46 mounted on the frame and having a sprocket 47 connected by a chain 48 to a sprocket 49 fixed to the drum shaft 50.

The machine may be connected to the propelling vehicle by any suitable means, indicated at 51.

The upper portion of the bin may be reinforced by a pair of upwardly extending arms 52 fixed to each side of the bin and having their upper ends connected by a bar 53. The arms 52 and bar 53 may conveniently serve as a guard rail for operators on the platform 15.

Means for locking the doors 7 and 7' and for automatically releasing the lock to permit exit of a tripod with a shock thereon when the feet 21 and 22 are placed in tripod-releasing position are provided. While various means may be provided for the purpose, that illustrated is particularly effective. As shown in Figure 4, the free edges of the doors are provided with flanges 54 and 55 adapted to abut substantially when the doors are in closed position. An arm 56 having a hooked end 56' is pivoted at 57 to a shoulder 58 fixed to door 7 and is arranged to be swung into engagement with the remote face of flange 55 on the door 7' to lock the doors in closed position. A lever 59 is also mounted on pivot 57 and is provided with a cam surface 60 adapted to engage a bar 61 pivoted at 62 intermediate its ends to shoulder 58. In the closed position of the doors, the bar 61 lies substantially parallel to arm 56 and in opposed closely adjacent relation thereto. A flexible cable, cord or the like 63 is connected to the free end of lever 59 and extends laterally therefrom past the hook 56' and over a supporting pulley 64 mounted on a bracket 65 fixed to door 7. The cable 63 then reverses its direction and extends around door 7 and the adjoining side of the bin, and over pulley 66 mounted on the under surface of platform portion 18 closely adjacent lever 36, the end of the cable being connected to the handle 37 of the lever. It will be observed that, when the lever 36 is pulled upwardly, the cable will be pulled therewith, which action will swing lever 59 to the position shown in dotted lines in Figure 4. Such movement of lever 59 will cause cam surface 60 to engage one end of bar 61 and swing its other end into engagement with arm 56 to swing the hooked end 56' out of clamping engagement with the flanges 54 and 55 and thus permit the doors to swing open under the influence of the formed hay shock.

A ladder 70 to permit operators conveniently to reach the platform 15 may be mounted on the frame.

The operation of the apparatus will be apparent from the foregoing description. With the apparatus being propelled over a cut hay field, a tripod is placed in the bin and one or more operators stationed on platform 15. As the hay is deposited on the platform, the operators place it in the bin about the tripod therein. When the bin is filled with hay, the operator actuates lever 36 to deposit the tripod on the ground and unlock the doors 7 and 7'. As the legs of the tripod engage the ground, the tripod will assume a stationary upright position thereon and move out of the bin through the open doors 7 and 7'. The formed hay cock 67 is illustrated in Figure 5.

It is important that the hay shock produced on the tripod have greater length than width, as formed by the oval bin described, since such formation prevents any tendency of the shock to lose its balance and topple over when deposited on the ground. When the shock is deposited on the ground and the machine moves forwardly thereof, the doors 7 and 7' are closed, another tripod is placed in the bin, and the operation repeated.

It will be observed that the inclined bottom plates 9 and 10 of the bin tend to impart an upwardly bevelled contour to the lower end of the hay cock, as indicated at 68, thus preventing the lower end of the hay cock from closely packed engagement with the ground. As a result, air may circulate freely around the bottom of the hay cock, into the substantially free space 69 within the tripod and through the hay carried thereby. Thus, a most effective and rapid curing treatment of the hay may take place. Because of the effective curing treatment provided, hay cocks of 800 pounds and upwards may be satisfactorily handled by the machine. Moreover, the hay may be formed into shocks substantially immediately after cutting, although it is preferable that a few hours' time be permitted to elapse to permit evaporation of surface moisture produced by dew or the like.

It should be understood that the term "hay" is intended to include any type of grass crop, including the various forms of clover, alfalfa and the like.

What is claimed is:

1. For use with a hay shock-supporting frame, a hay shocking and treating machine comprising a wheel supported main frame, an upright bin carried on the rearward portion of the main frame, the top and major portion of the bottom of the bin being free from closure means, pins journalled in the frame at the base of said bin, a plurality of separate, spaced feet fixed to the pins and extending rearwardly thereof, said feet being disposed in normally horizontal relation directly below the open bottom of the bin, said feet being arranged to support said supporting frame in the bin, a lever fixed to each pin, a second lever reciprocally mounted in the frame, and linkage means connecting the levers to rotate said pins in the same direction in response to reciprocation of said second lever, and to swing said feet into downwardly inclined position to permit disengagement of said supporting frame therefrom.

2. A hay shocking and treating machine as defined in claim 1, wherein the rearward portion of said bin is constituted by a pair of doors, means for locking the doors in closed position, and means responsive to reciprocation of said second lever for releasing said locking means.

3. A hay shocking and treating machine as defined in claim 4, wherein the rearward portion of said bin is constituted by a pair of doors, an arm pivotally carried by one door and having a hook engaging the other door to lock the doors in closed position, a lever carried by the first door and having a cam surface, a bar pivotally mounted on the first door and engageable by the cam surface, said bar engaging said arm in response to engagement by the cam surface to swing said hook out of engagement with said other door, a flexible cord connecting said cam lever to said second lever and arranged to swing the cam surface of the cam lever into engagement with said bar in response to reciprocation of the second lever.

4. For use with a hay shock-supporting tripod, a hay shocking and treating machine comprising a wheel-supported main frame, an upright bin of substantially oval cross-section carried on the rearward portion of the main frame, said bin having substantially flat side portions and curved end portions, the curved rearward end portion being constituted by a pair of doors, said bin being open at the top and having a pair of downwardly inclined plates on each of said curved end portions and partially closing the bottom of the bin, a pair of laterally spaced feet located below the open bottom section of the bin one adjacent each of said flat side portions, pins journalled in the frame and carrying said feet, said feet having tripod-carrying portions extending rearwardly of said pins, a foot located below the open bottom section of the bin adjacent the forward end thereof, a shaft journalled in the frame and carrying the latter foot, said latter foot having a tripod-carrying portion extending rearwardly of said shaft, levers fixed to said pins and shaft, links connecting said levers for simultaneous movement thereof, a horizontally disposed platform adjacent the top of the bin, a reciprocatable lever mounted in the platform, means connecting said reciprocatable lever with said links to move the latter and rotate said pins and shaft and revolve said feet in the same direction, said feet being normally disposed in horizontal position to support the legs of said tripod and being revolvable in response to actuation of said reciprocatable lever to an inclined position to permit disengagement of the tripod legs therefrom, means for locking said doors in closed position, and means responsive to actuation of said reciprocatable lever for releasing said locking means.

5. For use in combination with a hay-carrying frame, a hay shocking and treating machine comprising a wheel-supported main frame, an upright bin carried on the rearward end of the main frame and having a forward portion in fixed relation to the main frame, a pair of doors constituting its rearward portion, means for locking said doors in closed position, and a bottom opening extending throughout the major cross-sectional area of both said portions, a plurality of separate, spaced feet pivotally carried by the main frame directly below the bottom opening in said forward portion, means for normally holding said feet in substantially horizontally disposed position, said feet in such position being engageable by the hay-carrying frame to support the latter in upright position within the bin, means for swinging said feet downwardly in unison, and means for simultaneously actuating said last-mentioned means and for unlocking said doors whereby the hay-carrying frame will disengage itself from said feet and move downwardly through said opening, and then outwardly through said doors.

6. For use with a hay shock-supporting tripod, a hay shocking and treating machine comprising a wheel-supported main frame, an upright bin of oval cross-section carried on the rearward end of the main frame, said bin being greater in length in the direction of the longitudinal axes of the machine than in width, said bin having a forward portion in fixed relation to the main frame, a pair of doors constituting its rearward portion, means for locking said doors in closed position, and a bottom opening extending throughout the major cross-sectional area of both said portions, three separate, spaced feet pivotally carried by the main frame, all of said feet being located directly below the bottom opening of said forward portion, two of said feet being laterally aligned and each adjacent a respective side of the bin, mechanism for holding said feet in substantially horizontally disposed position for engagement by the legs of the tripod to support the latter in upright position within the bin, said mechanism being actuable to swing said feet downwardly in unison, and a lever for simultaneously actuating said mechanism and releasing said locking means whereby the tripod will disengage itself from said feet and move downwardly through said opening, and then outwardly through said doors.

7. A hay shocking and treating machine as defined in claim 6, including a plurality of plates partially closing the bottom of the bin, said plates being inclined downwardly from and fixed to the wall of the bin.

8. A hay shocking and treating machine, as defined in claim 6, wherein the width of the bin is from two-thirds to three-quarters of the length of the bin.

ROBERT A. JAMIESON.

REFERENCES CITED

The following references are of record in the file of this patent:

UNITED STATES PATENTS

| Number | Name | Date |
|---|---|---|
| 1,272,666 | Isom | July 16, 1918 |
| 2,328,790 | Dorsey | Sept. 7, 1943 |

FOREIGN PATENTS

| Number | Country | Date |
|---|---|---|
| 268,174 | Great Britain | Mar. 31, 1927 |
| 87,259 | Sweden | Sept. 1, 1936 |
| 508,216 | Great Britain | June 28, 1939 |